United States Patent
Darolia et al.

(10) Patent No.: US 6,749,951 B1
(45) Date of Patent: Jun. 15, 2004

(54) COATED ARTICLE HAVING A QUASICRYSTALLINE-DUCTILE METAL LAYERED COATING WITH HIGH WEAR RESISTANCE, AND ITS PREPARATION AND USE

(75) Inventors: Ramgopal Darolia, West Chester, OH (US); Robert Edward Schafrik, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/388,674

(22) Filed: Mar. 14, 2003

(51) Int. Cl.[7] .......................... B32B 15/01; B32B 31/00
(52) U.S. Cl. .................... 428/615; 428/636; 428/637; 428/651; 428/652; 428/653; 428/660; 428/668; 428/680; 428/681; 428/686; 428/908.8; 428/926; 428/937; 428/938
(58) Field of Search ................................ 428/615, 636, 428/637, 651, 652, 653, 660, 668, 680, 681, 686, 908.8, 926, 937, 938

(56) References Cited

U.S. PATENT DOCUMENTS

| | | |
|---|---|---|
| 5,432,011 A | 7/1995 | DuBois et al. ............. 428/553 |
| 5,652,877 A | 7/1997 | Dubois et al. ............. 428/553 |
| 5,888,661 A | 3/1999 | Dubois et al. ............. 428/548 |
| 6,183,887 B1 | 2/2001 | Dubois et al. ............. 428/651 |
| 6,242,108 B1 | 6/2001 | Sordelet et al. ............ 428/615 |
| 6,254,699 B1 | 7/2001 | Hermanek ................. 148/403 |
| 6,254,700 B1 | 7/2001 | Hermanek ................. 148/403 |

OTHER PUBLICATIONS

K.F. Kelton, "Ti/Zr–Based Quasicrystals–Formation, Structure and Hydrogen Storage Properties", Mat.Res.Soc.Symp. Proc. vol. 553, pp. 471–482 (1999), (no month given).

Daniel J. Sordelet et al., "Quasicrystals: Perspectives and Potential Applications", MRS Bulletin, pp. 34–37 (Nov. 1997).

Primary Examiner—Robert R. Koehler
(74) Attorney, Agent, or Firm—Gregory O. Garmong; Carmen Santa Maria; McNees Wallace & Nurick LLC

(57) ABSTRACT

A coated article having a high resistance to wear damage has a substrate, and a layered coating overlying the substrate. The layered coating includes a ductile metallic layer overlying and in facing contact with the substrate, and a protective layer overlying and in facing contact with the ductile metallic layer and including a mixture of a quasicrystalline metallic phase and a non-quasicrystalline ductile phase. The coated article is preferably used in applications where it is subjected to wear conditions.

17 Claims, 2 Drawing Sheets

COATED ARTICLE HAVING A QUASICRYSTALLINE-DUCTILE METAL LAYERED COATING WITH HIGH WEAR RESISTANCE, AND ITS PREPARATION AND USE

This invention relates to the protection of substrates, such as against wear damage and, more particularly, to the use of layered quasicrystalline-ductile metal coatings to provide that protection.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forward. There may additionally be a bypass fan that forces air around the center core of the engine, driven by a shaft extending from the turbine section.

A number of structures in the gas turbine engine are subjected to conditions of wear at temperatures ranging from ambient to moderately elevated. In wear, the contacting surfaces of two components rub against each other in point, line, or full-surface contact. Typical results include scoring of one or both surface, and possibly metal removal from one or both surfaces. As the surfaces are damaged, they become even more susceptible to the effects of wear as their effective coefficients of friction rise and wear debris is trapped between the wearing surfaces, so that the wear damage accelerates with increasing time in service.

The wear condition sometimes arises because it is not desirable or possible to firmly affix the two components together to prevent the rubbing action, because of the functionality of the components. An example is a cylindrical bushing used to support a variable stator vane in the compressor section of the gas turbine engine, wherein the element inserted into the bushing rotates or slides in contact with the surface of the bushing. Another example is the dovetail of a compressor, bypass-fan, or gas turbine blade, which must fit loosely into its dovetail slot of the rotor upon which it is mounted due to considerations of loading and expansion, and therefore rubs against the dovetail slots during service.

In most cases, the materials of construction of the rubbing components must be selected for reasons other than wear resistance. The rubbing components therefore are often susceptible to wear damage. In some cases, reduced wear damage may be realized by applying hard coatings such as tungsten carbide-cobalt, carbide, or nitride material to one or both of the contacting surfaces, or by hardening one or both of the contacting surfaces with a surface treatment such as carburizing or nitriding. However, these approaches have shortcomings, primarily associated with an insufficient service life at elevated service temperatures. The coating or surface treatments may be affected by pilling, galling, or the like. In some cases the coating or surface treatments are subject to environmental damage such as oxidation and/or corrosion. Additionally, the use of hard coatings and surface-hardening treatments may lead to reduced fatigue life of the components by serving as the source of surface cracks that are formed in the hard surface layers and propagate into the components as they are cyclically loaded during service.

There is accordingly a need for an improved approach to the protection of gas turbine components, such as bushings and dovetail surfaces, and other articles as well, against the damage caused by wear. The present invention fulfills this need, and further provides related advantages.

SUMMARY OF THE INVENTION

The present invention provides an approach for preparing an article having a layered coating thereon. The layered coating is particularly effective in protecting a substrate against the effects of wear damage and may be optimized for this use as described herein, although it is not limited to this use. The coating of the present approach is further tailored to minimize the possibility that cracks in the coating can propagate into the underlying substrate to cause it to fail prematurely, as by a fatigue mechanism.

A coated article comprises a substrate; and a layered coating overlying the substrate. The coating comprises a ductile metallic layer in facing contact with the substrate, and a protective layer overlying and in facing contact with the ductile metallic layer. The ductile metallic layer and the protective layer are both preferably substantially continuous. The protective layer in turn comprises a mixture of a quasicrystalline metallic phase and a non-quasicrystalline ductile phase. Preferably but not necessarily, the quasicrystalline metallic phase is present in the protective layer in an amount of from about 90 volume percent to about 99 volume percent, most preferably embedded in the non-quasicrystalline ductile phase which serves as a matrix. Preferably but not necessarily, the protective layer has a thickness of from about 10 to about 100 micrometers, and the ductile metallic layer has a thickness of from about 5 to about 10 micrometers.

In an application of interest, the substrate is a component of a gas turbine engine. The substrate may be, for example, a bushing or a dovetail of a blade.

The quasicrystalline metallic phase, which is a relatively hard, brittle material, may be any operable material. Following the usual convention in the art, the term "quasicrystalline" as used herein includes both pure-quasicrystalline compositions and also approximant-quasicrystalline compositions. Alloys of most current interest include an alloy comprising iron, copper, and aluminum, an alloy comprising iron, cobalt, chromium, and aluminum; an alloy comprising nickel, cobalt, chromium, and aluminum; an alloy comprising titanium, zirconium, nickel, and silicon; and an alloy comprising titanium, nickel, and zirconium. The ductile metallic layer may be any operable material that is not a quasicrystalline metal, but desirably is a metal such as an iron-base alloy, a nickel-base alloy or a titanium-base alloy. The ductile metallic layer is preferably, but not necessarily, a different metal than the substrate. It is preferred that the protective layer and the ductile metallic layer each are of about the same coefficient of thermal expansion, and about the same coefficient of thermal expansion as the underlying substrate, to minimize differential thermal expansion thermal stresses and strains resulting from temperature changes during fabrication and during service.

A method for providing a coated article having a high resistance to wear damage comprises the steps of providing a substrate, and applying a layered coating overlying the substrate to form the coated article. The coating comprises a ductile metallic layer in facing contact with the substrate, and a protective layer overlying and in facing contact with the ductile metallic layer. The protective layer comprises a mixture of a quasicrystalline metallic phase and a non-quasicrystalline ductile phase. The coated article is subjected to wear conditions. Operable features and modifications of the approach discussed elsewhere may be utilized in this embodiment as well.

The layered coating includes the relatively hard composite protective layer to provide good wear resistance. This composite protective layer includes the quasicrystalline metallic phase and the non-quasicrystalline ductile phase, which is typically a metal (which for the present purposes includes conventional metals and metal-like intermetallic compounds such as FeAl). The non-quasicrystalline ductile phase improves the fracture toughness of the protective layer, as compared with a layer having only the quasicrystalline metallic phase, and also improves its friction and wear properties.

The ductile metallic layer serves as a bond coat to ensure the adhesion of the protective layer to the substrate. The ductile metallic layer also has the beneficial effect of preventing cracks that may initiate in the less-ductile protective layer and specifically in the quasicrystalline metallic phase from propagating inwardly to the substrate, and thence causing premature cracking of the substrate. Any such cracks are blunted and deflected when they reach the ductile layer.

The use of the present layered coating provides a significant improvement in resistance to wear damage as compared with an unprotected substrate article. The present layered coating also has important advantages as compared with conventional protective coatings such as the commonly used tungsten carbide-cobalt nonlayered coating. The present layered coating has significantly lower density than the tungsten carbide-cobalt coating, and a better match to the coefficient of thermal expansion of the substrate in most cases. The quasicrystalline exposed layer of the layered coating has good environmental performance, such as elevated temperature corrosion resistance and oxidation resistance.

Another important advantage of the present approach is that the layered coating is operable to the moderately elevated temperatures to which many components of an aircraft gas turbine engine are subjected during service. The maximum temperature depends upon the composition of the wear coating, but is as high as 1000° C. for some quasicrystalline materials.

The present invention thus provides a layered coating that is resistant to wear damage and protects the underlying substrate against wear damage. It is also resistant to initiating premature cracking in the substrate. In all applications, the structure of the coating avoids inducing premature failure of the substrate due to the formation of cracks in the coating and the propagation of those cracks into the substrate, a particular concern in fatigue-loading conditions. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
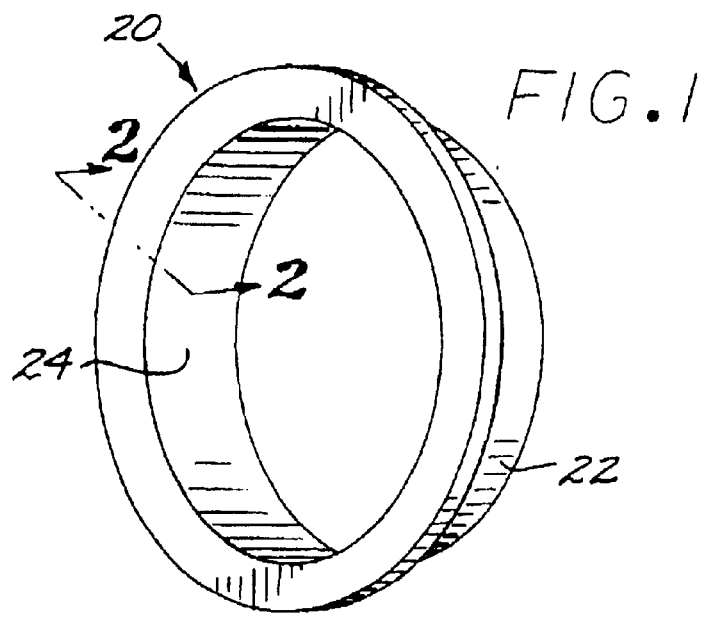
FIG. 1 is a perspective view of a component of a gas turbine engine.

FIG. 1 depicts a coated article 20. This coated may be a component of a gas turbine engine, such as an illustrated bushing 22. The bushing 22 is subjected to wear at its surface 24 (in this case an inner cylindrical surface) during service, at a range of wear loads, temperatures, and other conditions. The surface 24 is coated with a layered coating, as discussed subsequently, to improve its wear resistance. The bushing 22 is presented as an illustration. The present approach is not limited to this application, and may be used in other applications such as the dovetails of turbine, compressor, and fan blades.

Figure 2:
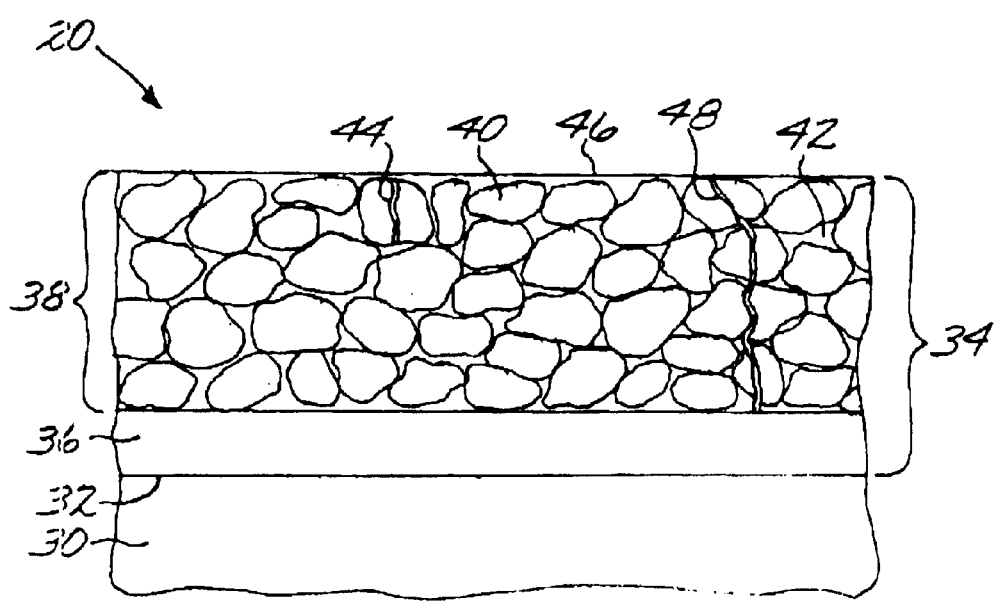
FIG. 2 is an enlarged sectional view of the component of FIG. 1, taken along line 2—2 and illustrating the layered coating.

FIG. 2 depicts the surface region of the coated article 20 in greater detail. The uncoated article serves as a substrate 30 having a substrate surface 32. The substrate 30 may be made of any operable metal, with iron-base alloys such as steels, nickel-base alloys, and titanium-base alloys of particular interest. A layered coating 34 overlies and contacts the surface 32 of the substrate 30. The layered coating 34 comprises a substantially continuous ductile metallic layer 36 overlying and in facing contact with the substrate 30 and its substrate surface 32, and a substantially continuous protective layer 38 overlying and in facing contact with the ductile metallic layer 36. The layered coating 34, and in particular the protective layer 38, has an exposed free surface 46. Preferably but not necessarily, the ductile metallic layer 36 has a thickness of from about 5 to about 10 micrometers, and the protective layer 38 has a thickness of from about 10 to about 100 micrometers.

The protective layer 38 is a mixture of at least two phases, including at least a quasicrystalline metallic phase 40 and a non-quasicrystalline ductile phase 42. Following the usual convention in the art, the term "quasicrystalline" as used herein includes both pure-quasicrystalline compositions and also approximant-quasicrystalline compositions. The non-quasicrystalline ductile phase 42 is not, however, an approximant-quasicrystalline composition.

Preferably but not necessarily, the quasicrystalline metallic phase 40 is present in the protective layer 38 in an amount of from about 90 volume percent to about 99 volume percent of the total volume of the protective layer 38. In some embodiments, the non-quasicrystalline ductile phase 42 occupies the remainder of the volume of the protective layer 38, while in other embodiments other phases and/or porosity may be present as well. It is preferred that the non-quasicrystalline ductile phase 42 be substantially continuous (possibly with occasional isolated pockets), with the quasicrystalline metallic phase 40 being noncontinuous and present as discrete pieces embedded in the non-quasicrystalline ductile phase 42 that serves as a matrix binding the pieces of the quasicrystalline metallic phase 40 together, as illustrated in FIG. 2. The non-crystalline ductile phase 42 may instead be present as a substantially noncontinuous phase, with the quasicrystalline metallic phase 40 being continuous, so that the non-crystalline ductile phase 42 is present as discrete pieces embedded in the quasicrystalline metallic phase 40.

Quasicrystalline materials used in the quasicrystalline metallic phase 40 are known in the art. Examples are found in an alloy comprising iron, copper, and aluminum (e.g., $Al_{62.5}Cu_{25}Fe_{12.5}$); an alloy comprising iron, cobalt, chromium, and aluminum (e.g., $Al_{71}Co_{13}Fe_8Cr_8$; an alloy comprising nickel, cobalt, chromium, and aluminum (e.g., $Al_{75}Ni_{15}(CoCr)_{10}$); an alloy comprising titanium, zirconium, nickel, and silicon (e.g., $Ti_{45}Zr_{27}Ni_{20}Si_8$); and an alloy comprising titanium, nickel, and zirconium (e.g., $Ti_{45}$—$Zr_{38}$—$Ni_{17}$). Other elements such as boron may optionally be present. Discussions of quasicrystalline alloys and operable compositions may be found in U.S. Pat. Nos. 6,254,699; 6,242,108; 6,183,887; 5,888,661; and 5,652,877, and publications such as K. F. Kelton, "Ti/Zr-Based Quasicrystals—Formation, Structure, and Hydrogen Storage Properties", Mat. Res. Soc. Symp. Proc., Vol. 553 (1999), page 471, whose disclosures are incorporated by reference. Some of the quasicrystalline materials are stable at elevated temperatures of up to 1000° C. or higher, depending upon the exact composition, sufficient for most bushing, compressor blade, and bypass fan blade applications. The field of quasicrystalline materials is relatively new, and additional alloys are being discovered. The present approach is operable with existing and newly discovered quasicrystalline materials. Generally, quasicrystalline alloys are hard, with very limited ductilities (elongations to failure), and thence may be described as "brittle" herein relative to the ductile metallic layer and the non-quasicrystalline ductile phase.

Metals used in the ductile metallic layer 36 and in the non-quasicrystalline ductile phase 42 are ductile, that is, having a relatively high elongation to failure compared to the quasicrystalline metallic phase 40. The ductile metallic layer 36 and in the non-quasicrystalline ductile phase 42 are metals. They may be the same metal, or different metals. The ductile metallic layer 36 and the non-quasicrystalline ductile phase 42 are preferably made of a material different from the substrate 30, and have a higher ductility (that is, greater elongation to failure in tension) than the substrate. As used herein, "ductile" and "brittle" are used in a relative sense to each other, and not in any absolute sense. A "ductile" metal has an elongation to failure in tension that is greater than that of the "brittle" quasicrystalline material. A "ductile" metal typically has an elongation to failure of at least about 2 percent in tension, when tested at room temperature. The ductile metallic layer 36 preferably is a metal having a composition and/or a coefficient of thermal expansion relatively close to that of the protective layer 38, and a coefficient of thermal expansion relatively close to a coefficient of thermal expansion of the substrate 30, to minimize the incidence of thermal expansion mismatch stains and stresses that lead to cracking and/or spalling of the layered coating 34. It is preferred that the quasicrystalline metallic phase 40 and the non-crystalline ductile phase 42 be present in the protective layer 38 in amounts such that the coefficient of thermal expansion of the protective layer 38 is relatively close to those of the ductile metallic layer 36 and the substrate 30. As used herein, "relatively close" as applied to coefficients of thermal expansion means that the coefficients of thermal expansion are within about $2 \times 10^{-6}/°$ F. of each other.

Each of the layers 36 and 38 is "substantially continuous" with respect to each other, a term used herein to distinguish the layered structure from morphologies that are not within the scope of the invention and in which small pieces of the quasicrystalline material are dispersed within a layer of the ductile metal, or small pieces of the ductile metal are dispersed within a layer of the quasicrystalline metal to form the entire coating and not just one of the layers. (However, in the present approach layer 38 is itself a composite structure of two or more phases, and the layer 36 may have other second phases or dispersoids distributed therethrough.) The conventional coating of small pieces of tungsten carbide dispersed in a cobalt matrix is an example of a material that is not within the scope of the present approach. In the structure according to the present approach, each layer 36 and 38 need not be fully continuous over the entire surface 32 of the substrate, because in some cases only certain portions of the surface 32 need be protected and in other cases some portions of the layers 36 and/or 38 may be removed by wear damage or other effects during service. Preferably, in the "substantially continuous" layered structure, each layer 36 and 38 extends in the in-plane directions of the substrate surface 32 at least 10 times the thickness of the layer in a perpendicular direction that is perpendicular to the substrate surface 32.

A important advantage of using the layered coating 34 is that the ductile metallic layer 36 serves to block crack propagation of cracks in the less-ductile protective layer 38. Such cracks are of particular concern in applications where the substrate is subjected to conditions of fatigue. If cracks initiating in the coating were allowed to propagate into the substrate, they could serve as initiation sites for premature fatigue failure of the substrate. Thus, in a conventional brittle coating, if a crack initiates in the brittle coating, the crack may propagate into the substrate and thereby accelerate its premature failure. In the layered coating 34 of the present approach, if a crack 44 initiates internally within the quasicrystalline metallic phase 40, in most cases the propagation of the crack 44 is blunted and deflected by the non-quasicrystalline ductile phase 42. If a crack 48 initiates at the free surface 46 or within the protective coating 38 and is not blunted and deflected by the non-quasicrystalline phase 42 so that it propagates through the protective coating 38, it is blunted and deflected by the underlying ductile metallic layer 36 so that, in any event, it cannot penetrate to the substrate 30. Crack propagation from the protective layer 38 into the substrate 30 is thereby prevented, and there is no fatigue deficit associated with the presence of the protective layer 38. A cracked protective layer 38 is still able to function partially in resisting wear damage.

Figure 3:
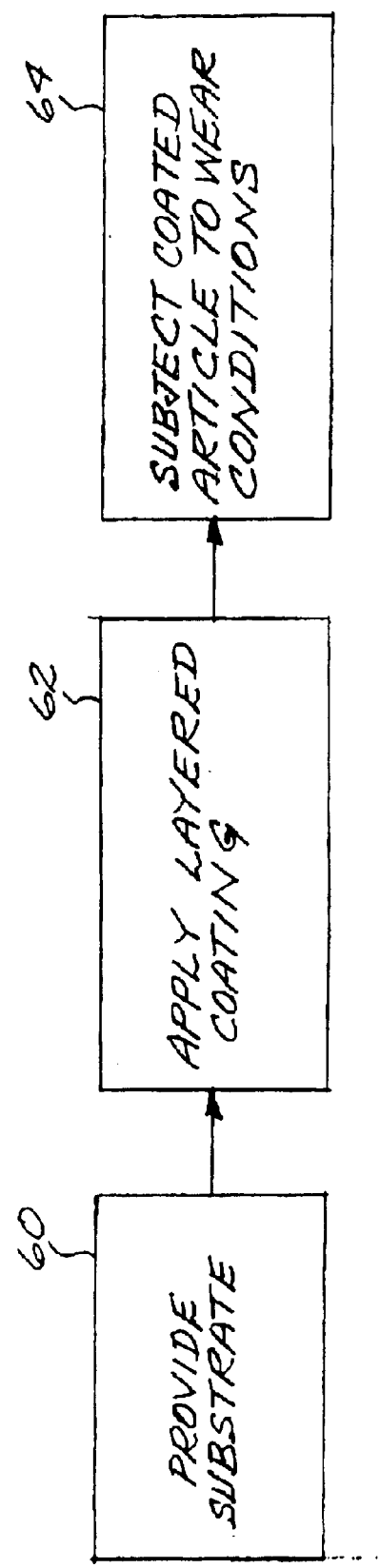
FIG. 3 is a block flow diagram of a method for preparing and using the coated article.

FIG. 3 depicts a preferred method for practicing the invention. The substrate 30 is provided, step 60. The substrate 30 has the desired shape and dimensions of the final coated article, except that it may be slightly undersize dimensionally to account for the thickness of the layered coating. The layered coating 34 is applied to the surface 32 of the substrate 30, step 62, to produce the coated article 20. The ductile metallic layer 36 is applied first, to overlie and contact the surface 32, and the protective layer 38 is applied second, to overlie and contact the ductile metallic layer 36. The application of the layers 36 and 38 is by any operable method, and to any desired thickness. The layers 36 and 38 need not be applied by the same techniques, although that is preferred as a matter of manufacturing efficiency. Preferred application techniques used in step 62 include physical vapor deposition techniques such as electron beam physical vapor deposition, sputtering, and cathodic arc, and plasma spray techniques such as air plasma spray, low pressure plasma spray, and high velocity oxyfuel deposition. All of these techniques are known in the art for other applications.

The coated article 20 is preferably, but not necessarily, subjected to wear conditions, step 64. As described above, the structure according to the present approach has been determined to be particularly useful in conditions of wear damage, and has been optimized for that application. The use of the coated substrate is not limited to this application, however. It may be used in applications requiring other properties such as impact resistance, for example. In all cases, however, it realizes advantages such as not inducing premature fatigue failure of the substrate.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A coated article comprising:

a substrate; and a layered coating overlying the substrate, the layered coating comprising a ductile metallic layer in facing contact with the substrate, and a protective layer overlying and in facing contact with the ductile metallic layer, wherein the protective layer comprises a mixture of a quasicrystalline metallic phase and a non-quasicrystalline ductile phase.

2. The coated article of claim 1, wherein the ductile metallic layer is substantially continuous and the protective layer is substantially continuous.

3. The coated article of claim 1, wherein the quasicrystalline metallic phase is present in the protective layer in an amount of from about 90 volume percent to about 100 volume percent.

4. The coated article of claim 1, wherein the quasicrystalline metallic phase is present as discrete pieces embedded in the non-quasicrystalline ductile phase.

5. The coated article of claim 1, wherein the protective layer has a thickness of from about 10 to about 100 micrometers, and the ductile metallic layer has a thickness of from about 5 to about 10 micrometers.

6. The coated article of claim 1, wherein the substrate is a component of a gas turbine engine.

7. The coated article of claim 1, wherein the substrate is a component of a gas turbine engine selected from the group consisting of a bushing and a dovetail of a blade.

8. The coated article of claim 1, wherein the quasicrystalline metallic phase is an alloy made of a material selected from the group consisting of an alloy comprising iron, copper, and aluminum; an alloy comprising iron, cobalt, chromium, and aluminum; an alloy comprising nickel, cobalt, chromium, and aluminum; an alloy comprising titanium, zirconium, nickel, and silicon; and an alloy comprising titanium, nickel, and zirconium.

9. The coated article of claim 1, wherein the quasicrystalline metallic phase further comprises boron.

10. The coated article of claim 1, wherein a difference between a coefficient of thermal expansion of the protective layer and a coefficient of thermal expansion of the ductile metallic layer is no more than about $2 \times 10^{-6}/°$ F.

11. The coated article of claim 1, wherein a difference between a coefficient of thermal expansion of the protective layer, a coefficient of thermal expansion of the ductile metallic layer, and a coefficient of thermal expansion of the substrate is no more than about $2 \times 10^{-6}/°$ F.

12. A method for providing a coated article having a high resistance to wear damage, comprising the steps of:

providing a substrate;

applying a layered coating overlying the substrate to form the coated article, the layered coating comprising a ductile metallic layer in facing contact with the substrate, and a protective layer overlying and in facing contact with the ductile metallic layer, wherein the protective layer comprises a mixture of a quasicrystalline metallic phase and a non-quasicrystalline ductile phase; and subjecting the coated article to wear conditions.

13. The method of claim 12, wherein the step of providing the substrate includes the step of providing the substrate that is a component of a gas turbine engine.

14. The method of claim 12, wherein the step of providing the substrate includes the step of providing the substrate that is a compressor-section airfoil of a gas turbine engine selected from the group consisting of a bushing and a dovetail of a blade.

15. The method of claim 12, wherein the step of applying includes the steps of applying the ductile metallic layer having a thickness of from about 5 to about 10 micrometers, and applying the protective layer having a thickness of from about 10 to about 100 micrometers.

16. The method of claim 12, wherein the step of applying includes the steps of providing the quasicrystalline metallic phase made of a material selected from the group consisting of an alloy comprising iron, copper, and aluminum; an alloy comprising iron, cobalt, chromium, and aluminum; an alloy comprising nickel, cobalt, chromium, and aluminum; an alloy comprising titanium, zirconium, nickel, and silicon; and an alloy comprising titanium, nickel, and zirconium.

17. The method of claim 12, wherein the step of applying includes the step of selecting the protective layer and the ductile metallic layer such that a difference between a coefficient of thermal expansion of the protective layer and a coefficient of thermal expansion of the ductile metallic layer is no more than about $2 \times 10^{-6}/°$ F.

* * * * *

UNITED STATES PATENT AND TRADEMARK OFFICE
CERTIFICATE OF CORRECTION

PATENT NO. : 6,749,951 B1
DATED : March 14, 2003
INVENTOR(S) : Ramgopal Darolia and Robert Edward Schafrik It is certified that error appears in the above-identified patent and that said Letters Patent is hereby corrected as shown below:

Column 4,
Line 66, under the heading Detailed Description of the invention: "$Al_{62.5}Cu_{25}Fe_{12.5}$);" should be -- $Al_{62.5}Cu_{25}Fe_{12.5}$); --.

Column 7,
Line 55, "$2x10^{-6}/°F$." should be -- $2x10^{-6}/°F$. --.

Column 8,
Lines 5 and 53, "$2x10^{-6}/°F$." should be -- $2x10^{-6}/°F$. --.

Signed and Sealed this

First Day of February, 2005

JON W. DUDAS
*Director of the United States Patent and Trademark Office*